(12) United States Patent
Gugau et al.

(10) Patent No.: US 10,280,833 B2
(45) Date of Patent: May 7, 2019

(54) EXHAUST-GAS TURBOCHARGER

(71) Applicant: BorgWarner Inc., Auburn Hills, MI (US)

(72) Inventors: Marc Gugau, Frei-Laubersheim (DE); Alessio Scheri, Dannenfels (DE)

(73) Assignee: BorgWarner Inc., Auburn Hills, MI (US)

(*) Notice: Subject to any disclaimer, the term of this patent is extended or adjusted under 35 U.S.C. 154(b) by 52 days.

(21) Appl. No.: 15/310,145

(22) PCT Filed: May 19, 2015

(86) PCT No.: PCT/US2015/031503
§ 371 (c)(1),
(2) Date: Nov. 10, 2016

(87) PCT Pub. No.: WO2015/179353
PCT Pub. Date: Nov. 26, 2015

(65) Prior Publication Data
US 2017/0107896 A1    Apr. 20, 2017

(30) Foreign Application Priority Data
May 20, 2014  (DE) .................. 10 2014 209 484

(51) Int. Cl.
*F01D 5/04* (2006.01)
*F01D 5/14* (2006.01)
(Continued)

(52) U.S. Cl.
CPC ............ *F02B 37/025* (2013.01); *F01D 5/048* (2013.01); *F01D 5/14* (2013.01); *F01D 25/24* (2013.01);
(Continued)

(58) Field of Classification Search
CPC .......... F02B 37/025; F01D 5/14; F01D 5/048; F01D 25/24; F05D 2220/40
(Continued)

(56) References Cited

U.S. PATENT DOCUMENTS 3,313,518 A * 4/1967 Nancarrow ............. F01D 17/12
                                                         415/13
4,141,672 A * 2/1979 Wieland .................. F01D 1/023
                                                         415/1
(Continued)

FOREIGN PATENT DOCUMENTS

DE      3908285 C1 *  6/1990  ............. F01D 5/048
DE      3941399 C1 *  1/1991  ........... F01D 17/143
(Continued)

OTHER PUBLICATIONS

International Search Report and Written Opinion in International Application No. PCT/US2015/031503, dated Oct. 22, 2015.
(Continued)

*Primary Examiner* — J. Todd Newton
(74) *Attorney, Agent, or Firm* — Eric L. Doyle; Stephan A. Pendorf; Patent Central LLC

(57) ABSTRACT

An exhaust-gas turbocharger, preferably for a passenger vehicle, including a turbine having a turbine wheel and a turbine housing. A number of $S \geq 2$ of channels are formed in the turbine housing and are intended for guiding the exhaust gas onto the turbine wheel. Each channel directs flow against the turbine wheel over the entire width of the latter, as seen in the axial direction, and over a segment, as seen in relation to the circumferential direction. The turbine wheel has a number of $Z \geq 10$ turbine blades. The turbine blades are defined in the form of main blades and intermediate blades. The intermediate blades, at least at their hub-side ends, do (Continued)

not extend as far toward the turbine outlet, as seen in the axial direction, as the main blades.

6 Claims, 5 Drawing Sheets

(51) Int. Cl.
*F02B 37/02* (2006.01)
*F01D 25/24* (2006.01)

(52) U.S. Cl.
CPC ...... *F05D 2220/40* (2013.01); *F05D 2250/51* (2013.01); *Y02T 10/144* (2013.01)

(58) Field of Classification Search
USPC ........................................... 60/605.1
See application file for complete search history.

(56) References Cited

U.S. PATENT DOCUMENTS

| | | | | |
|---|---|---|---|---|
| 4,177,005 | A * | 12/1979 | Bozung | F01D 9/026 415/128 |
| 4,389,845 | A | 6/1983 | Koike | |
| 4,586,336 | A * | 5/1986 | Horler | F01D 17/143 415/158 |
| 4,850,802 | A * | 7/1989 | Pankratz | F01D 5/02 228/113 |
| 5,214,920 | A * | 6/1993 | Leavesley | F01D 17/143 415/157 |
| 5,441,383 | A * | 8/1995 | Dale | F01D 17/143 415/150 |
| 2004/0074642 | A1* | 4/2004 | Price-Smith | E21B 43/103 166/278 |
| 2007/0031261 | A1* | 2/2007 | Lombard | F01D 5/048 416/203 |
| 2007/0231141 | A1* | 10/2007 | Chaing | F01D 5/048 416/185 |
| 2009/0290980 | A1* | 11/2009 | Higashimori | F01D 17/148 415/205 |
| 2012/0269636 | A1* | 10/2012 | Xu | F01D 5/141 416/185 |
| 2013/0104539 | A1 | 5/2013 | Sumser et al. | |
| 2015/0218949 | A1* | 8/2015 | Higashimori | F01D 5/048 415/205 |
| 2015/0330226 | A1* | 11/2015 | Yokoyama | F01D 5/14 416/235 |
| 2016/0025044 | A1* | 1/2016 | Martinez-Botas | F01D 9/026 60/605.2 |
| 2017/0107896 | A1* | 4/2017 | Gugau | F01D 5/048 |
| 2017/0292381 | A1* | 10/2017 | Ishii | F01D 5/048 |
| 2017/0298737 | A1* | 10/2017 | Kuno | F01D 5/048 |

FOREIGN PATENT DOCUMENTS

| | | | |
|---|---|---|---|
| DE | 10318737 A1 * | 11/2004 | ............ F02B 37/025 |
| DE | 102005019937 B3 * | 5/2006 | ............ F01D 5/048 |
| DE | 102005032002 A1 * | 1/2007 | ............... F01D 1/06 |
| DE | 102007011508 A1 * | 11/2007 | ............. F02B 37/00 |
| GB | 2062116 A | 5/1981 | |
| JP | 56118521 A | 9/1981 | |
| JP | 2011117344 A | 6/2011 | |
| JP | 2013530335 A | 7/2013 | |
| WO | 2004074642 A1 | 9/2004 | |

OTHER PUBLICATIONS

Chinese Office Action (with English language translation) dated Sep. 28, 2017, in Chinese Application No. 201580025780.8.
Chinese Office Action (with English language translation) dated Jun. 4, 2018, in Chinese Application No. 201580025780.8.
Japanese Office Action (with English language translation) dated Nov. 26, 2018, in Japanese Application No. 2016-566748.

* cited by examiner

EXHAUST-GAS TURBOCHARGER

The present invention relates to an exhaust-gas turbocharger. It presents, in particular, a compact exhaust-gas turbocharger which is used in passenger vehicles.

In exhaust-gas turbochargers according to the prior art, exhaust gas is directed onto a turbine wheel of the exhaust-gas turbocharger via at least one volute. It is known, for pulse charging in a volute, for two channels to be separated from one another by means of a separating crosspiece. The two channels can lead to different cylinders of the associated internal combustion engine. In the case of this arrangement, the two channels are arranged one beside the other in the axial direction of the turbocharger, and therefore each individual channel does not direct flow against the entire width of the turbine wheel. The problem here is that the separating crosspiece always conceals a certain part of the turbine wheel and flow cannot be directed directly against this part of the turbine wheel. In order to ensure a certain level of stability and endurance strength, the separating crosspiece cannot be configured to be as thin as desired.

It is an object of the present invention to specify an exhaust-gas turbocharger which, along with cost-effective production and low-maintenance operation, allows pulse charging, is simultaneously compact and can be used, in particular, in passenger vehicles.

The object is achieved by the features of the independent claim. The dependent claims relate to the advantageous configuration of the invention.

The object is thus achieved by an exhaust-gas turbocharger, preferably for a passenger vehicle, comprising a compressor having a compressor wheel and a turbine having a turbine wheel. The turbine wheel is arranged in a turbine housing. The compressor wheel is connected to the turbine wheel by means of a shaft. Exhaust gas, for example from an internal combustion engine, flows against the turbine wheel. This causes the shaft, and thus also the compressor wheel, to rotate. Charge air, for example for the internal combustion engine, is compressed via the compressor wheel. At least two channels for guiding the exhaust gas onto the turbine wheel are formed in the turbine housing. The number of channels is referred to as "S". The shaft extends in an axial direction from the compressor to the turbine. This axial direction lies along the axis of the shaft and/or the axis of the turbine wheel and of the compressor wheel. A radial direction is defined perpendicularly to the axial direction. A circumferential direction is defined around the axial direction, counter to the direction of rotation of the turbine wheel. Each of the at least two channels directs flow against the turbine wheel over the entire width of the latter. The width of the turbine wheel is defined in the axial direction. Furthermore, each channel directs flow against the turbine wheel over a segment, as seen in relation to the circumferential direction. If use is made of two channels, each channel therefore directs flow against the turbine wheel over 180° and over the entire width of the turbine wheel. The invention does not provide two axially adjacent channels subdivided via a separating crosspiece. This means that the turbine wheel is not partially concealed by the separating crosspiece.

The respective channels terminate on their radial inner side with a so-called tongue. Account has to be taken of the fact that this tongue at least partially prevents optimum flow against the turbine wheel. Since the invention here provides at least two channels, which act on the turbine wheel in a state in which they are offset through 180°, there are two such tongues adversely affecting the optimum flow against the turbine wheel. This adverse effect is noticeable in particular in the case of compact exhaust-gas turbochargers and correspondingly small turbine wheels. It has been found, within the framework of the invention, that sufficiently good flow against the turbine wheel, even with the channels offset through 180°, can be achieved if there is an appropriately high number of turbine blades—at least ten blades. The number of turbine blades will be referred to hereinbelow as "Z". It is particularly preferable for at least twelve, and further preferably for at least fourteen, turbine blades to be provided.

A so-called narrowest flow-outlet cross-sectional surface area is usually defined on exhaust-gas turbochargers. This narrowest flow-outlet cross-sectional surface area is measured at the turbine outlet, on the turbine-outlet-side edges of the turbine blades.

The narrowest flow-outlet cross-sectional surface area here is measured perpendicularly to the blade surfaces and is defined as the clear width of the individual surfaces between the turbine blades. The more turbine blades are arranged on the turbine wheel, the smaller is the narrowest flow-outlet cross-sectional surface area, since it is the thickness of the turbine-outlet-side edge which reduces the flow-outlet cross-sectional surface area in each case. However, a certain narrowest flow-outlet cross-sectional surface area is advantageous for the optimum operation of an exhaust-gas turbocharger. Use is therefore preferably made of main blades and intermediate blades of the turbine wheel. The intermediate blades, at least at their hub-side ends, do not extend in the axial direction as far as the main blades. This ensures that the intermediate blades do not affect the narrowest flow-outlet cross-sectional surface area. The narrowest flow-outlet cross-sectional surface area is consequently defined along the turbine-outlet-side edges of the main blades and, in addition, is adversely affected only by the thicknesses of the turbine-outlet-side edges of the main blades.

In particular, provision is made for an intermediate blade to be arranged in each case between two main blades. If the total number is at least ten turbine blades, this therefore means that use is made of five main blades and five intermediate blades. In particular, provision is made to use at least six main blades and at least six intermediate blades, particularly preferably at least seven main blades and at least seven intermediate blades.

As mentioned in the introduction, the radial inner side of each channel terminates with a so-called tongue. The end of the tongue is defined as the tip. A neck cross-sectional surface area $A1$ of the respective channel is defined at this tip of the tongue.

An imaginary straight line in the radial direction through the axis of the turbine wheel is located in the neck cross-sectional surface area $A1$. The abovementioned narrowest flow-outlet cross-sectional surface area at the turbine-outlet-side edges of the turbine blades is referred to as $A2$. Provision is preferably made for the following to be the case: $A2/A1 \leq 0.9$, preferably $A2/A1 \leq 1.0$. This ratio of the flow-outlet cross-sectional surface area $A2$ to the neck cross-sectional surface area $A1$ of the individual channels ensures optimum operation of the exhaust-gas turbocharger. In particular the narrowest flow-outlet cross-sectional surface area $A2$, which is relatively small for this purpose, is achieved by using the intermediate blades mentioned above. However, it is also possible, by virtue of the turbine blades being formed appropriately, to achieve the ratio without using intermediate blades.

Furthermore, provision is preferably made for a turbine-wheel inlet diameter D to be defined at the turbine wheel, as measured up to the radial ends of the turbine blades. If use is made of the main blades and of the intermediate blades, the turbine-wheel inlet diameter D is defined up to the radial ends of the main blades. It is preferably the case that S □A1/D 15 mm, preferably S □A1/D 12 mm. These variables define, in particular, that the exhaust-gas turbocharger is a small one, with a correspondingly small turbine wheel. In particular with this size of exhaust-gas turbocharger, use should be made of the arrangement according to the invention of the channels, in conjunction with the at least ten turbine blades, in order to achieve the best possible efficiency.

Furthermore, provision is preferably made for at least one tongue of one channel to be shortened. The tip of the tongue of one channel forms a geometrical reference point. Starting from this reference point, the next channel terminates at 360° /S, as measured in the circumferential direction. If use is made of two channels, therefore, the one channel terminates at 0° and the other channel terminates at 180°. Provision is preferably made for the tip of the tongue of the second channel to be shortened by an angle α in the circumferential direction. For this angle α, it is preferably the case that (360° /Z) −5°≥α≥5°. In particular this shortening by at least 5° reduces the risk of blade fatigue failure.

In particular the following constructions are preferably provided for the formation of the channels and volutes: according to a first variant, a dedicated volute is formed in the turbine housing for each channel. There are therefore at least two volutes, which, offset in particular through 180°, lead from the internal combustion engine to the exhaust-gas turbocharger. Each volute has a channel formed in it.

In the second variant, provision is preferably made for a volute common to the two channels to be formed in the turbine housing. This one volute contains a crosspiece which separates the two channels from one another such that the one channel is arranged radially within the other channel. The crosspiece merges, in the direction of the turbine wheel, into the tongue of the outer channel.

The exhaust-gas turbocharger is used, in particular, for internal combustion engines having an even number of cylinders. It is immaterial which channel is connected to which cylinder.

The invention will be described hereinbelow with reference to exemplary embodiments and in conjunction with the drawing, in which.

Figure 1:
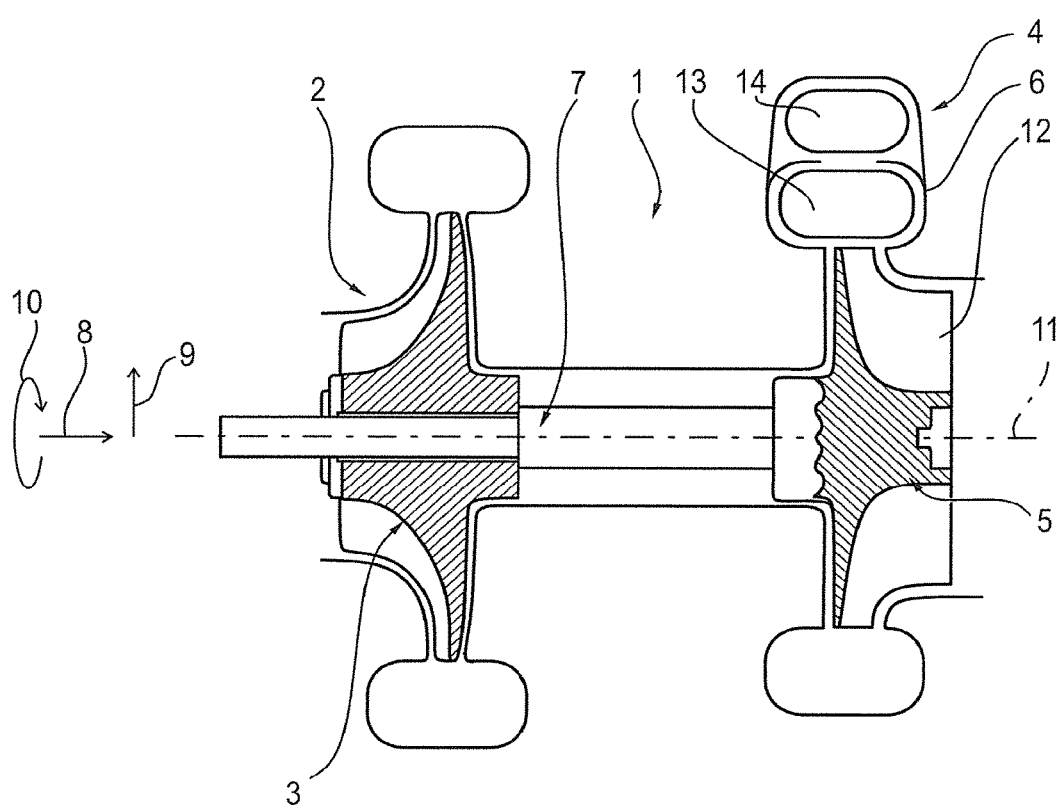
FIG. 1 shows a schematically simplified view of the exhaust-gas turbocharger according to all the exemplary embodiments of the invention; of the exhaust-gas turbocharger according to a first exemplary embodiment of the invention.

Exemplary embodiments of an exhaust-gas turbocharger 1 will be explained in detail hereinbelow. Identical, or functionally identical, components are provided with the same reference signs in all the exemplary embodiments. FIG. 1 shows the general construction of the exhaust-gas turbocharger 1 for all exemplary embodiments.

According to FIG. 1, the exhaust-gas turbocharger 1 has a compressor 2 having a compressor wheel 3. Also provided is a turbine 4 having a turbine wheel 5 and a turbine housing 6. A plurality of turbine blades 12 are formed on the turbine wheel 5. A shaft 7 connects the compressor wheel 3 to the turbine wheel 5.

Two channels 13, 14 are formed in the turbine housing 6. Exhaust gas is directed onto the turbine wheel 5 via said channels 13, 14. The turbine wheel 5 is thus caused to rotate. Via the shaft 7, the compressor wheel 3 is thus also caused to rotate. Air is taken in, and compressed, via the compressor wheel 3.

The shaft 7 extends in an axial direction 8. The axial direction 8 lies along the axis 11 of the turbine wheel 5. The axial direction 8 is defined from the compressor 2 in the direction of the turbine 4. A radial direction 9 runs perpendicularly to the axial direction 8. A circumferential direction 10 is defined around the axial direction 8. The circumferential direction 10 is defined counter to the direction of rotation of the turbine wheel 5.

Figure 2:
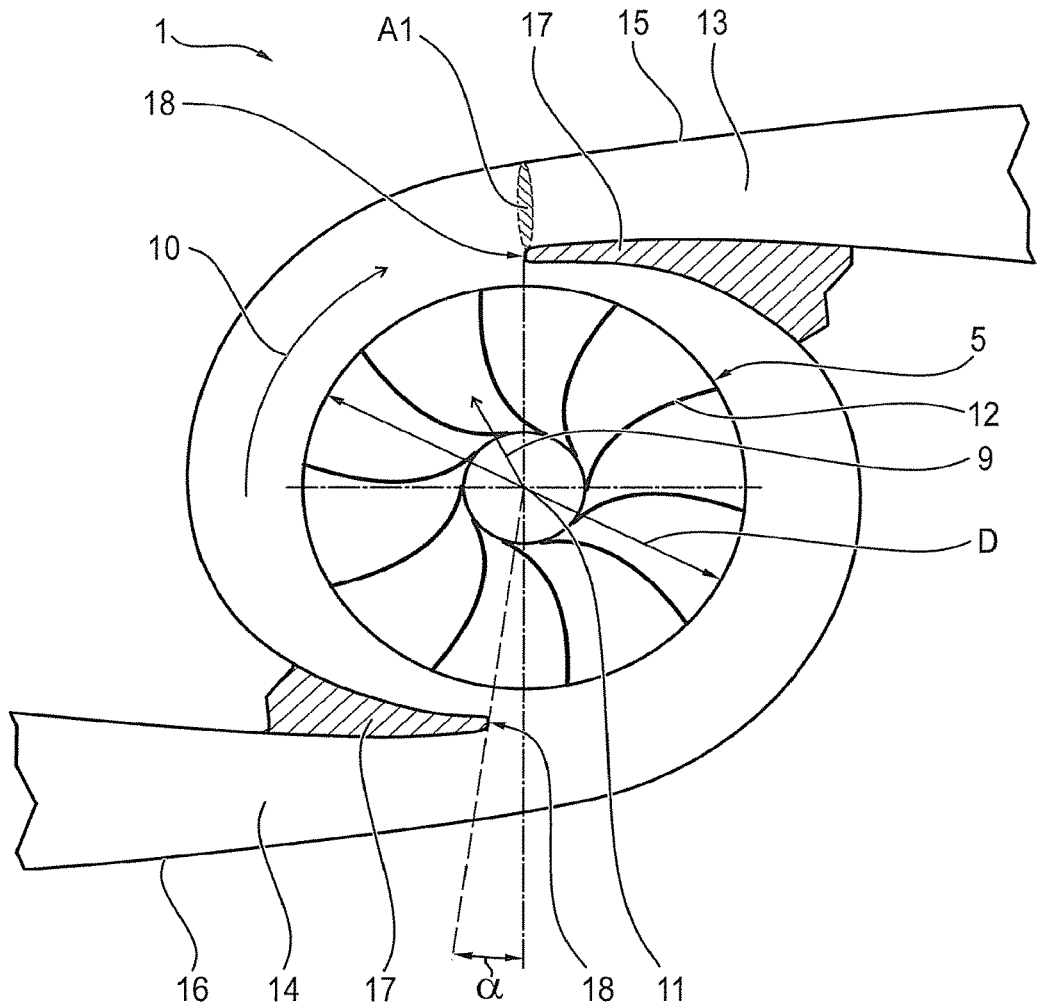

FIG. 2 shows, in a schematically simplified illustration, a section through the turbine 4 of the exhaust-gas turbocharger 1 according to the first exemplary embodiment. It can be seen that, in the first exemplary embodiment, two volutes 15, 16 are formed in the turbine housing 6. Each volute 15, 16 contains a respective channel 13, 14.

The channels 13, 14, or the volutes 15, 16, direct flow against the turbine wheel 5 in each case over the entire width of the latter, as defined in the axial direction 8. Each channel 13, 14 directs flow against the turbine wheel 5 over a segment of 180°.

The respective radial inner side of the channels 13, 14 terminates with a tongue 17. The end of the tongue 17 is defined as the tip 18.

Ten turbine blades 12 are provided on the turbine wheel 5.

Figure 3:
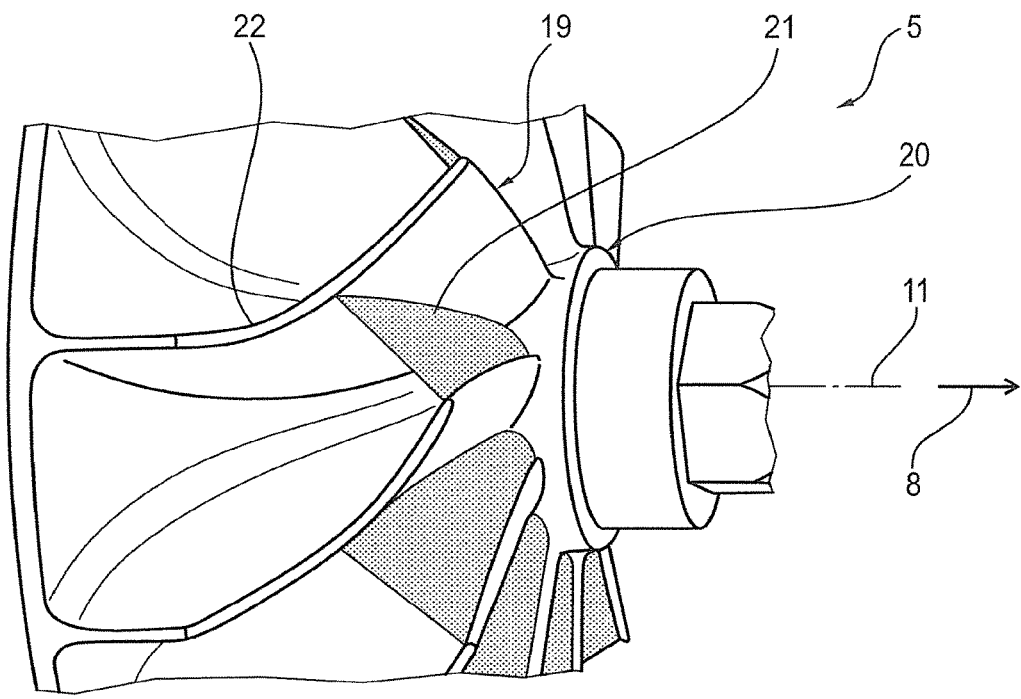
FIG. 3 shows the turbine wheel of the exhaust-gas turbocharger according to the first exemplary embodiment of the invention.

FIG. 3 shows a detail of the turbine wheel 5. Each of the turbine blades 12 has a turbine-outlet-side edge 19. This turbine-outlet-side edge 19 is located approximately perpendicularly to the axis 11 and is connected to a hub 20 of the turbine wheel 5. A narrowest flow-outlet cross-sectional surface area A2 is made up of ten sub-surfaces 21. Each sub-surface 21 is measured at the respective turbine-outlet-side edge 19, in a direction perpendicular to the surface of the turbine blade 12. The sum of these, in this case, ten sub-surfaces 21 forms the narrowest flow-outlet cross-sectional surface area A2. The illustration in FIG. 3 clearly shows that each turbine blade 12 used, in particular by virtue of its thickness, reduces the narrowest flow-outlet cross-sectional surface area A2.

A neck cross-sectional surface area A1 of the respective channel 13, 14 is defined at the tips 18 of the tongues. The ratio A2/A1 is preferably greater than or equal to 2□0.9, preferably 2□1.0.

Figure 4:
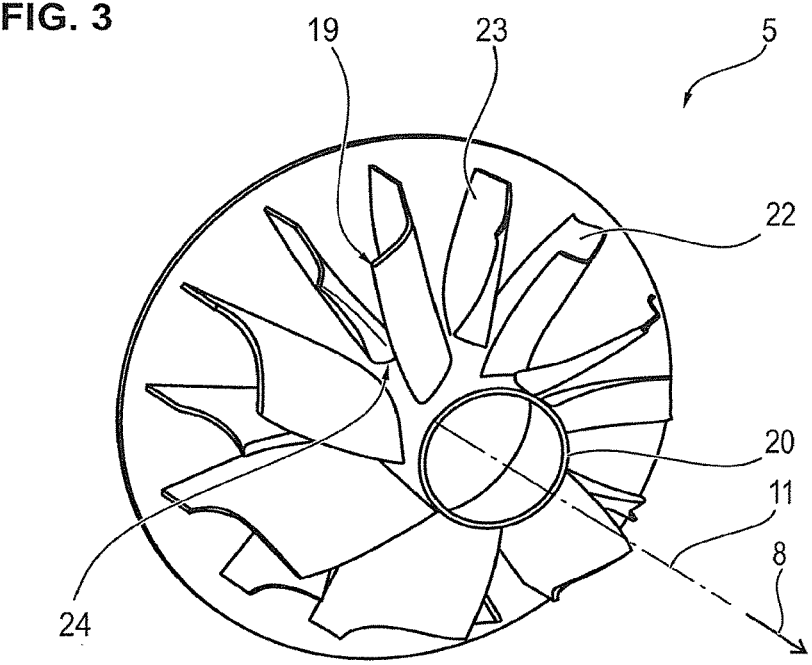
FIG. 4 shows the turbine wheel of the exhaust-gas turbocharger according to a second exemplary embodiment of the invention.

FIG. 4 shows a turbine wheel 5 according to the second exemplary embodiment. In this turbine wheel 5, the turbine blades 12 are designed in the form of main blades 22 and intermediate blades 23. An intermediate blade 23 is located in each case between two main blades 22. There are seven main blades 22 and, correspondingly, seven intermediate blades 23 provided.

The critical factor in the case of the turbine wheel 5 according to FIG. 4 is that the hub-side ends 24 of the intermediate blades 23 do not project as far in the axial direction 8 as the main blades 22. Consequently, the turbine-outlet-side edges 19 of the main blades 22 are decisive for the calculation of the narrowest flow-outlet cross-sectional surface area A2. The narrowest flow-outlet cross-sectional surface area A2 is not adversely affected by the design of the intermediate blades 23. This means that the preferred ratio of A2/A1 S ☐0.9, preferably A2/A1 S ☐1.0, can be realized to good effect.

Figure 5:
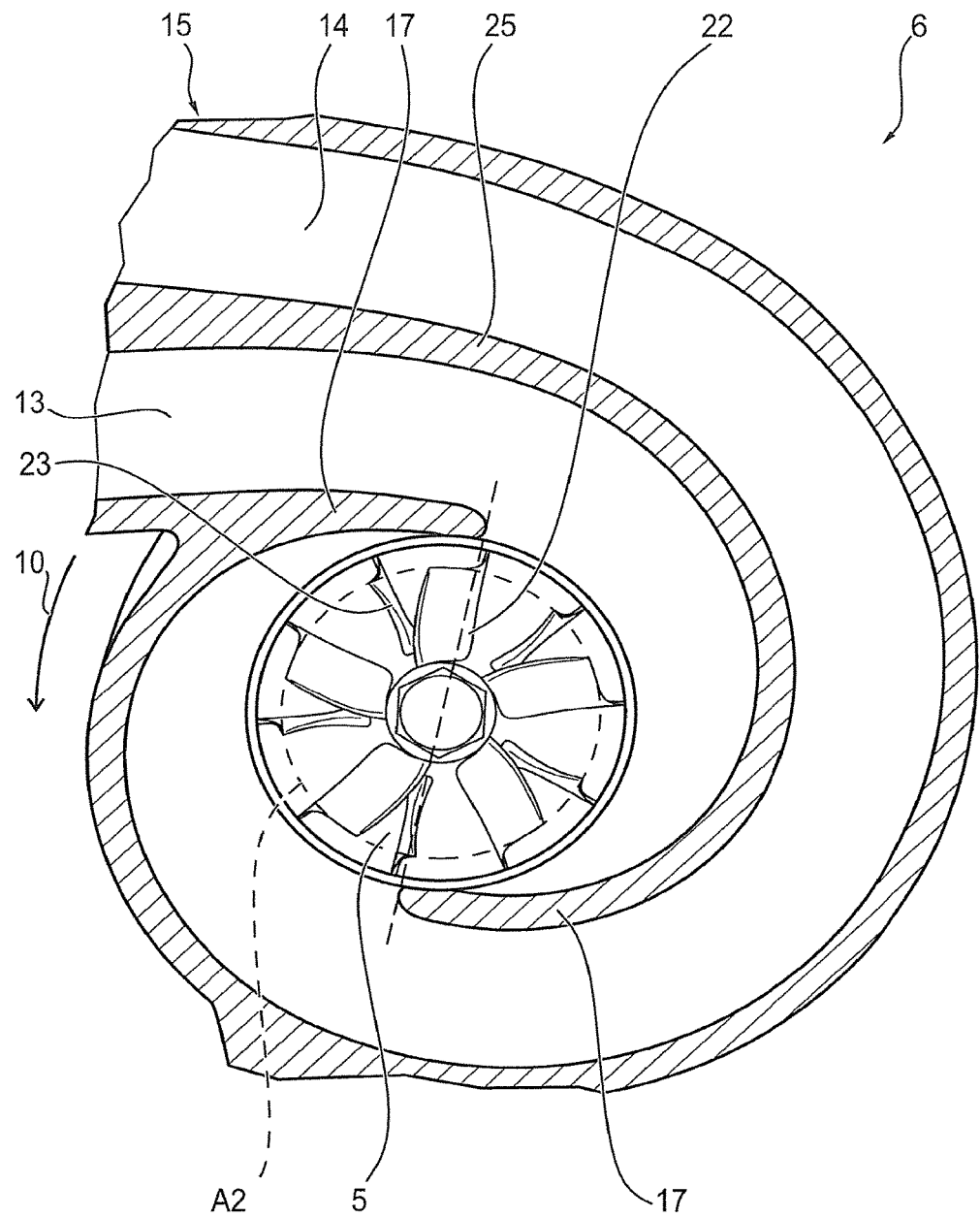
FIG. 5 shows a section through the turbine of the exhaust-gas turbocharger according to the second exemplary embodiment of the invention.

FIG. 5 shows the design of the turbine housing 6 for the second exemplary embodiment. A volute 15 common to both channels 13, 14 is formed in the second exemplary embodiment. The volute 15 is subdivided into the two channels 13, 14 by means of a crosspiece 25. The crosspiece 25 is arranged such that the two channels 13, 14 are adjacent to one another in the radial direction 9. This makes it possible for each of the channels 13, 14 to act over the entire width of the turbine wheel 5. As FIG. 5 shows, the crosspiece 25 merges into the tongue of the outer channel 14.

Figure 6:
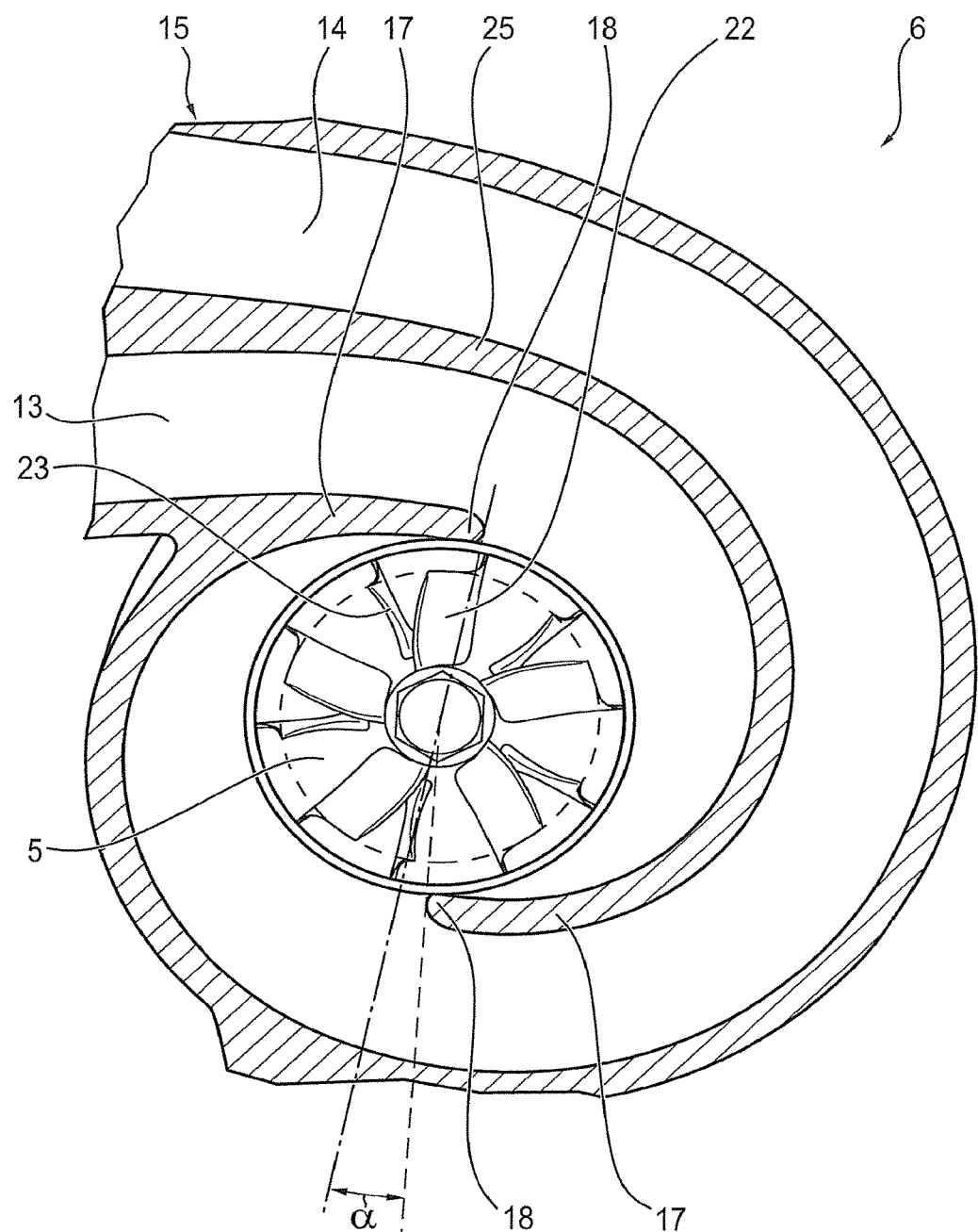
FIG. 6 shows a section through the turbine of the exhaust-gas turbocharger according to a third exemplary embodiment of the invention.

FIG. 6 shows the design of the turbine housing 6 for the third exemplary embodiment. The third exemplary embodiment corresponds to the second exemplary embodiment apart from the following difference: in the third exemplary embodiment, just as in FIG. 2, the tongue 17 of one channel 14 is shortened. The tip 18 of the tongue of the first channel 13 forms a geometrical reference point. Starting from this reference point, the next channel terminates at 360°/S, as measured in the circumferential direction. If use is made of two channels 13, 14, therefore, the first channel 13 terminates at 0° and the second channel 14 terminates at 180°. The tip 18 of the tongue of the second channel 14 here is shortened by an angle α in the circumferential direction. For this angle α, it is preferably the case that (360°/Z)−5° α 5°. In particular this shortening by at least 5° reduces the risk of blade fatigue failure.

The exhaust-gas turbochargers 1 shown here are provided, in particular, for small constructions. The intention is to have, in particular, a relatively small turbine wheel 5. FIG. 1 shows an inlet diameter D of the turbine wheel 5. This diameter D is preferably not more than 35 mm.

The construction of the turbine wheel 5 with the main blades 22 and the intermediate blades 23 can also be used in the first exemplary embodiment. It is equally possible for a turbine wheel 5 according to FIG. 3 to be used in the construction of the turbine housing 6 according to FIG. 5 or FIG. 6.

LIST OF REFERENCE SIGNS 1 exhaust-gas turbocharger
2 compressor
3 compressor wheel
4 turbine
5 turbine wheel
6 turbine housing
7 shaft
8 axial direction
9 radial direction
10 circumferential direction
11 axis
12 turbine blades
13 first channel
14 second channel
15 first volute
16 second volute
17 tongue
18 tip of the tongue
19 turbine-outlet-side edge
20 hub
21 sub-surface
22 main blades
23 intermediate blades
24 hub-side ends
25 crosspiece
A1 neck cross-sectional surface area
A2 flow-outlet cross-sectional surface area

The invention claimed is:

1. An exhaust-gas turbocharger (1) comprising
a compressor (2) having a compressor wheel (3),
a turbine (4) having a turbine wheel (5) and a turbine housing (6) having a turbine outlet,
a shaft (7), which connects the compressor wheel (3) to the turbine wheel (5), and
a number of channels (13, 14) formed in the turbine housing (6) for guiding the exhaust gas onto the turbine wheel (5),
wherein
an axial direction (8) is defined along the shaft (7), a radial direction (9) is defined perpendicularly to the axial direction (8), and a circumferential direction (10) is defined around the axial direction (8),
each channel (13, 14) directs flow against the turbine wheel (5),
the turbine wheel (5) comprises ≥10 turbine blades (12),
the turbine blades (12) are main blades (22) and intermediate blades (23), wherein the intermediate blades (23) do not extend as far toward the turbine outlet, as seen in the axial direction (8), as the main blades (22), and
a dedicated volute (15, 16) is formed in the turbine housing (6) for each channel (13, 14), wherein a radial inner side of each volute (15, 16) terminates with a tongue (17), and a neck cross-sectional area (A1) of the respective channel is determined across the channel at a tip (18) of the tongue (17), and a flow-outlet cross-sectional area (A2) is determined at the turbine outlet, and wherein flow-outlet cross-sectional area (A2) / neck cross-sectional area (A1) ≥ the number of channels·0.9.

2. The exhaust-gas turbocharger according to claim 1, wherein one of said intermediate blades (23) is arranged in each case between two main blades (22).

3. The exhaust-gas turbocharger according to claim 1, wherein a turbine-wheel inlet diameter (D) is defined at the turbine wheel (5), as measured up to the radial ends of the main blades (22), where the number of channels · neck cross-sectional area (A1)/ turbine-wheel inlet diameter (D) ≤15 mm.

4. The exhaust-gas turbocharger according to claim 1, wherein the volutes (15, 16) are offset through 360°/number of channels (13, 14) in the circumferential direction (10).

5. The exhaust-gas turbocharger according to claim 1, wherein at least one volute (15) is formed in the turbine housing (6), and wherein, in the volute (15), two channels (13, 14) are separated by a crosspiece (25), and therefore one channel (14) is arranged radially outside the other channel (13).

6. An exhaust-gas turbocharger (1) comprising
a compressor (2) having a compressor wheel (3),
a turbine (4) having a turbine wheel (5) and a turbine housing (6) having a turbine outlet,
a shaft (7), which connects the compressor wheel (3) to the turbine wheel (5), and
a number of channels (13, 14) formed in the turbine housing (6) for guiding the exhaust gas onto the turbine wheel (5), wherein
an axial direction (8) is defined along the shaft (7), a radial direction (9) is defined perpendicularly to the axial direction (8), and a circumferential direction (10) is defined around the axial direction (8),
each channel (13, 14) directs flow against the turbine wheel (5),
the turbine wheel (5) comprises ≥10 turbine blades (12),
the turbine blades (12) are main blades (22) and intermediate blades (23), wherein the intermediate blades (23) do not extend as far toward the turbine outlet, as seen in the axial direction (8), as the main blades (22),
a radial inner side of each volute (15, 16) terminates with a tongue (17) and associated tip (18),
the tip (18) of the tongue of one volute (15) forms a geometrical reference point and, starting from this reference point, the next channel (14) terminates at 360°/the number of turbine wheel blades [Z], as measured in the circumferential direction (10),
the tip (18) of the tongue of this next volute (16) is shortened by an angle $\alpha$ in the circumferential direction (10), and
(360°/number of turbine wheel blades [Z])−5°≥$\alpha$≥5°.

\* \* \* \* \*